(No Model.)
J. W. HAMER.
PLOW FENDER.
No. 307,113. Patented Oct. 28, 1884.
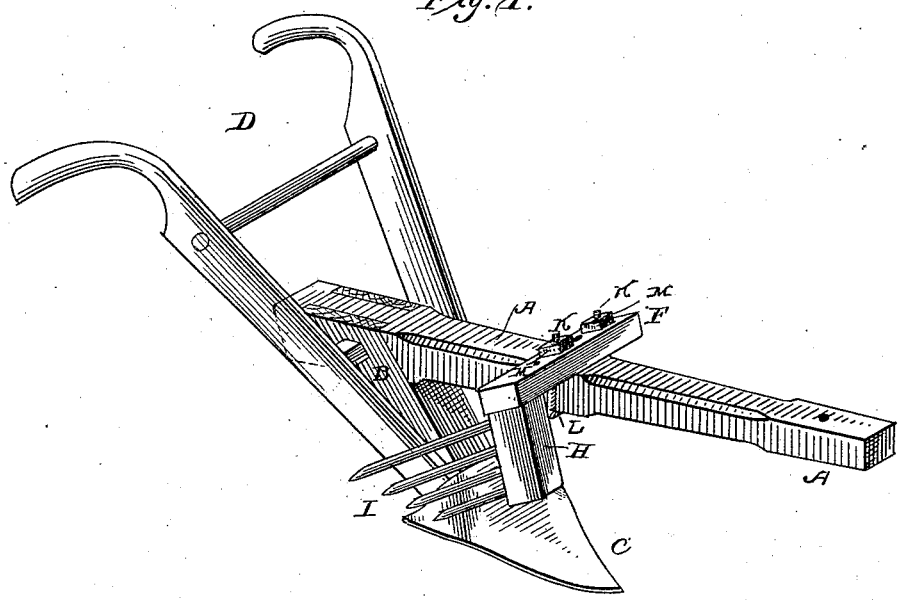
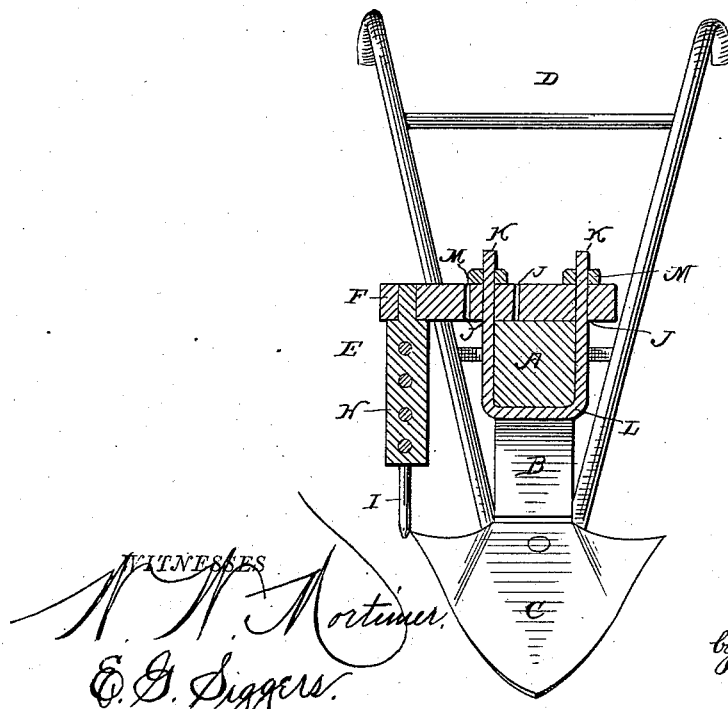
Witnesses:
N. W. Mortimer
E. G. Siggers
Jas. W. Hamer
INVENTOR
by C. A. Snow & Co.
Attorneys

UNITED STATES PATENT OFFICE.

JAMES WILLIAM HAMER, OF WINONA, MISSISSIPPI.

PLOW-FENDER.

SPECIFICATION forming part of Letters Patent No. 307,113, dated October 28, 1884.

Application filed July 10, 1884. (No model.)

*To all whom it may concern:*

Be it known that I, JAMES W. HAMER, a citizen of the United States, residing at Winona, in the county of Montgomery and State of Mississippi, have invented a new and useful Plow-Fender, of which the following is a specification, reference being had to the accompanying drawings.

My invention relates to plow-fenders designed to regulate the quantity of dirt that shall be thrown to plants while plowing them; and it has for its objects to produce a fender of the class referred to that shall possess superior advantages in point of simplicity, cheapness, durability, and general efficiency; and the invention consists in the construction and novel arrangement of parts, as will be hereinafter fully described, and particularly pointed out in the claim.

In the drawings, Figure 1 is a view in perspective of my improved fender attached to a plow. Fig. 2 is a transverse vertical sectional view of the same.

Referring by letter to the accompanying drawings, A designates the plow-beam, B the plow-standard, C the plow-point, and D the handles, of a single-shovel plow. This plow is shown to illustrate the application of the fender E, although any other style of plow may be used, and the fender is equally applicable to large and small plows. The fender E may be made either of wood or iron, or from wood and iron combined, if desired. It consists of a horizontal arm, F, beveled upwardly from the front to the rear on its under face to give it the proper inclination when in place on the plow-beam. To the right end of this horizontal arm F is secured by mortise and tenon, or otherwise, a vertically-depending arm, H, which is provided with a vertical series of rearwardly-extended tapering and slightly downwardly-inclined fingers I, which gradually decrease in length from above downward, as shown. The horizontal arm F is provided with a series of vertical holes, J, for the reception of the arms K of a staple-clip, L, which is held in place in two of these holes at one time by nuts M M. The fender E is clipped to the plow-beam by means of the clip L. The holes J in the arm F permit the fender to be adjusted to plows of different sizes. The fingers of the fender extend alongside of the plow-wing, and may be regulated to throw the desired quantity of dirt to the plants. Large clods will be warded from the plants by the fender, while the pulverized dirt will pass through the fingers to the plants. The plowman can plow nearer to the plants with the fender in place than can be done without it, and a greater amount of work can be done with the fender in place, as great care need not be exercised in plowing with the fender in place, while without the fender care must be exercised or the plants will be covered.

Having thus fully described my invention, what I claim as new, and desire to secure by Letters Patent of the United States, is—

The combination, with the plow, of the horizontal arm having the under-beveled face provided with a series of vertical holes, and the downwardly and forwardly inclined arm H, the series of downwardly and rearwardly inclined tapering fingers, of unequal length, and the staples and securing-nuts, substantially as specified.

In testimony that I claim the foregoing as my own I have hereto affixed my signature in presence of two witnesses.

JAMES WILLIAM HAMER.

Witnesses:
J. S. CAMERON,
M. W. STEVENS.